US 9,908,454 B1

(12) United States Patent
Waters, Jr.

(10) Patent No.: US 9,908,454 B1
(45) Date of Patent: Mar. 6, 2018

(54) TIE-DOWN STRAP COILING DEVICE

(71) Applicant: Terry Waters, Jr., Kaukauna, WI (US)

(72) Inventor: Terry Waters, Jr., Kaukauna, WI (US)

( * ) Notice: Subject to any disclaimer, the term of this patent is extended or adjusted under 35 U.S.C. 154(b) by 86 days.

(21) Appl. No.: 14/544,473

(22) Filed: Mar. 10, 2015

Related U.S. Application Data

(60) Provisional application No. 61/971,746, filed on Mar. 28, 2014.

(51) Int. Cl.
*B60P 7/08* (2006.01)

(52) U.S. Cl.
CPC .............. *B60P 7/0846* (2013.01); *B60P 7/083* (2013.01); *Y10T 24/21* (2015.01); *Y10T 24/2175* (2015.01)

(58) Field of Classification Search
CPC .... B60P 7/0846; B60P 7/083; Y10T 24/2117; Y10T 24/2175; Y10T 24/2121; Y10T 24/2147
See application file for complete search history.

(56) References Cited

U.S. PATENT DOCUMENTS

| | | | | |
|---|---|---|---|---|
| 3,393,309 A | * | 7/1968 | Leach | B25F 5/021 362/119 |
| 3,428,331 A | * | 2/1969 | Morgan | B60P 7/083 410/100 |
| 4,036,476 A | * | 7/1977 | Douce | B60P 7/083 410/103 |
| 5,129,698 A | * | 7/1992 | Cohrs | B60J 7/085 242/396.4 |
| 5,222,994 A | | 6/1993 | Hamaue | |
| 5,791,844 A | * | 8/1998 | Anderson | B60P 7/083 410/100 |
| 5,897,039 A | | 4/1999 | Swenke | |
| 5,941,666 A | * | 8/1999 | Waters | B60P 7/083 410/100 |
| 6,017,173 A | * | 1/2000 | Anthony | B60P 3/06 280/414.1 |
| 6,463,848 B1 | | 10/2002 | Haberstroh et al. | |
| 6,688,260 B2 | | 2/2004 | Morrison | |
| 6,729,604 B1 | * | 5/2004 | Claycomb | B60P 7/0846 24/68 R |
| 6,799,751 B1 | * | 10/2004 | Anderson | B60P 7/083 24/68 CD |
| 6,824,339 B1 | * | 11/2004 | Childers | B60P 7/0846 16/110.1 |
| 7,082,872 B2 | | 8/2006 | Goodley | |
| 7,100,902 B1 | * | 9/2006 | Lu | B60P 7/0846 24/69 ST |
| 7,216,849 B2 | * | 5/2007 | Tremblay | B60P 7/083 24/69 ST |
| 7,380,495 B1 | | 6/2008 | Wang | |
| 7,464,916 B1 | * | 12/2008 | Drinkhorn | B60P 7/0853 16/422 |
| 7,766,271 B1 | * | 8/2010 | Confoey | B60P 7/0846 24/68 CD |
| 7,857,560 B2 | * | 12/2010 | Leggett | B60P 7/083 410/100 |

(Continued)

*Primary Examiner* — Michael E Gallion
(74) *Attorney, Agent, or Firm* — Robert C. Montgomery; Montgomery Patent & Design, LP.

(57) ABSTRACT

A strap coiling device includes a housing, a spindle rotatably coupled within the housing, a return spring assembly operatively connected to the spindle within the housing, and a stator releasably engaged with the spindle, wherein a free end of a length of strap is coupled to the spindle and automatically wound around the spindle within the housing in response to disengagement of the spindle from a stator to allow rotation of the spindle caused by the return spring assembly.

20 Claims, 5 Drawing Sheets

(56) References Cited

U.S. PATENT DOCUMENTS

| | | | | |
|---|---|---|---|---|
| 7,877,846 B1* | 2/2011 | Chen | ............... | B60P 7/0846 24/68 CD |
| 7,942,360 B2* | 5/2011 | Breeden | ............... | B60D 1/18 242/378.1 |
| 8,408,521 B2* | 4/2013 | Huang | ............... | B60P 7/0846 24/69 ST |
| 8,684,390 B1* | 4/2014 | Barrette | ............... | B60D 1/185 242/370 |
| 8,974,159 B1* | 3/2015 | Ammann | ............... | B60P 7/0846 410/104 |
| 2002/0026692 A1* | 3/2002 | Curtin, Sr. | ............... | B60P 7/083 24/68 R |
| 2004/0108404 A1* | 6/2004 | Wiermaa | ............... | B65H 18/10 242/532.6 |
| 2004/0155230 A1* | 8/2004 | Fortin | ............... | B60P 7/083 254/219 |
| 2007/0170295 A1* | 7/2007 | Breeden | ............... | B60D 1/18 242/388.1 |
| 2008/0304932 A1* | 12/2008 | Leggett | ............... | B60P 7/083 410/100 |
| 2009/0236458 A1* | 9/2009 | Rodrique | ............... | B65H 54/585 242/374 |
| 2012/0205601 A1* | 8/2012 | Joubert | ............... | B60P 7/083 254/217 |
| 2012/0233824 A1* | 9/2012 | Breeden | ............... | B60P 7/083 24/68 CD |
| 2012/0241545 A1* | 9/2012 | Borntrager | ............... | B60P 7/0846 242/395 |
| 2013/0206895 A1* | 8/2013 | Van Benthem | ............... | B60P 7/0846 242/532.6 |

* cited by examiner

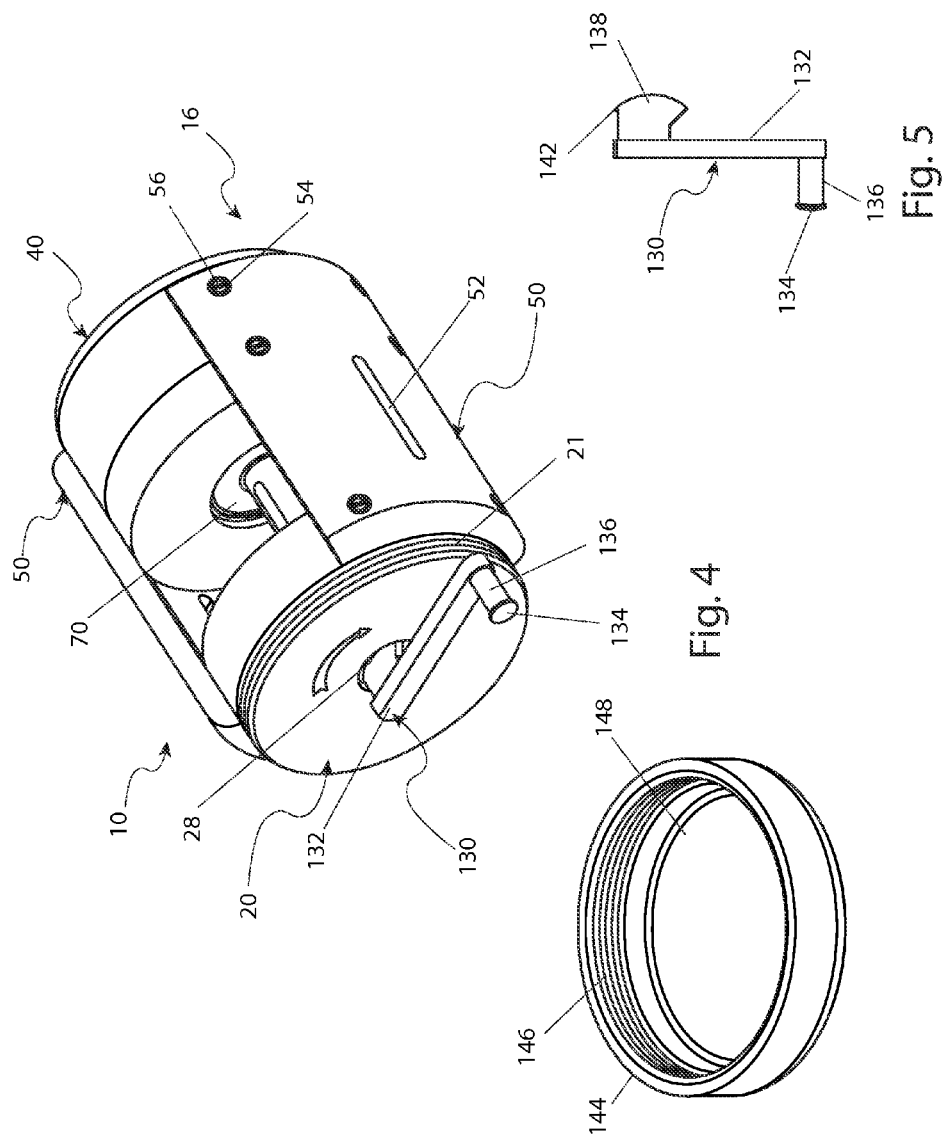

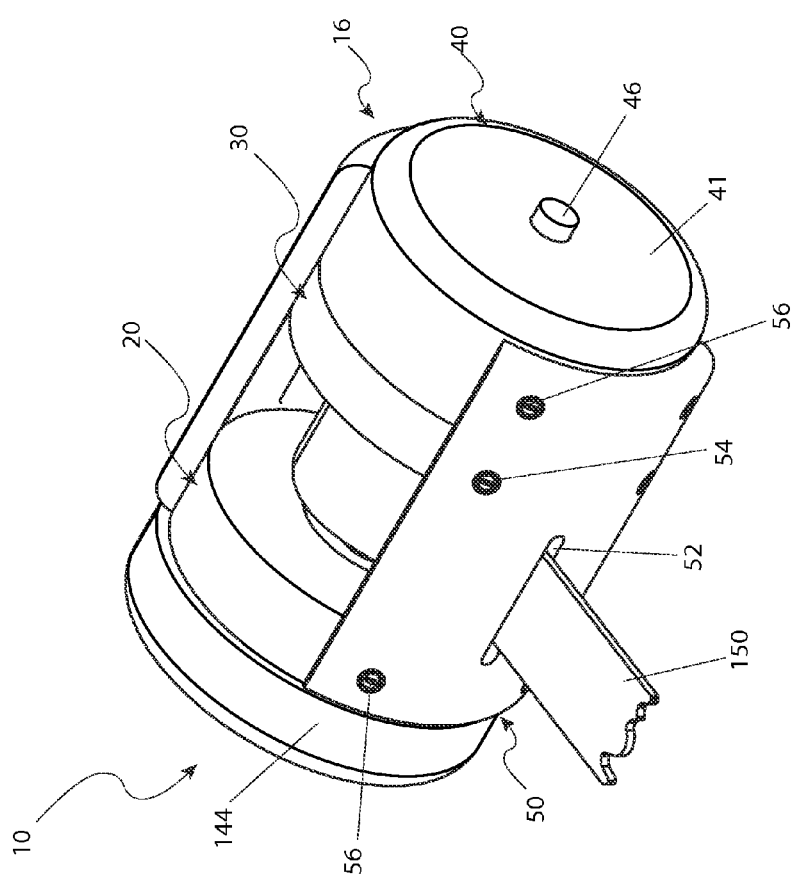

TIE-DOWN STRAP COILING DEVICE

RELATED APPLICATIONS

The present invention was first described in and claims the benefit of U.S. Provisional Application No. 61/971,746 filed Mar. 28, 2014 the entire disclosures of which are incorporated herein by reference.

FIELD OF THE INVENTION

The present invention relates generally to tie-down straps and, more particularly, to a tie-down strap coiling device.

BACKGROUND OF THE INVENTION

Ratchet clamp down straps for moving and securing objects are indispensable when compared to regular ropes. These straps provide a large amount of holding force, are easily tightened and loosened, and remain safely secured even when subject to vibration, weather elements, shifting loads, and the like.

However useful as these ratchet straps are, they do suffer from the fact that the excess strap material is difficult to restrain during transport. Many people tie the strap material onto itself, but the nylon strap material tends to become easily untied. Should the strap material be left to fly about, it can easily become damaged by flapping in the wind or dragging on the pavement. Such material could even be completely cut off should the wheels of the vehicle run over it.

Accordingly, there exists a need for a means by which excess strap material from ratchet straps can be easily restrained, without the disadvantages as described above.

SUMMARY OF THE INVENTION

The inventor has recognized the aforementioned inherent problems and lack in the art and observed that there is a need for a strap coiling device that ensures that loose ends of ratcheting cargo straps are secured, thus protecting them from damage. The development of the present invention, which will be described in greater detail herein, substantially departs from conventional solutions to fulfill this need.

In one (1) embodiment, the disclosed strap coiling device includes a housing, a spindle rotatably coupled within the housing, and a return spring assembly operatively connected to the spindle within the housing.

In another embodiment, the disclosed strap coiling device includes a length of strap comprising a free end, a housing, a spindle rotatably coupled within the housing, the spindle including a strap slot configured to receive the free end of the strap, and a return spring assembly operatively connected to the spindle within the housing for rotating the spindle and winding the length of strap around the spindle within the housing.

In another embodiment, the disclosed strap coiling device includes a housing including a first section including a first bearing, a second section spaced away from the first section and including a second bearing, a third section directly adjacent to the second section, and a pair of strap retainers connecting the first section, the second section, and the third section. The device includes a spindle including a first end rotatably coupled to the first bearing, a second end rotatably coupled to the second bearing, and a strap slot disposed between the first end and the second end. The second end extends into the third section. The device includes a return spring assembly positioned between the second section and the third section and operatively connected to the spindle for rotating the spindle. The return spring assembly being biased in a wound configuration. The device includes a stator positioned adjacent to the return spring assembly and connected to the third section. The second end of the spindle being releasably engaged with the stator for preventing rotation of the spindle.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4 is an exploded perspective view of the strap coiling device in accordance with one embodiment of the present invention;

FIG. 5 is a side elevational view of a rewind crank of the strap coiling device in accordance with one embodiment of the present invention; and, FIG. 6 is a perspective view of the strap coiling device depicted with a coiled strap in accordance with one embodiment of the present invention.

DESCRIPTIVE KEY

Figure 1:
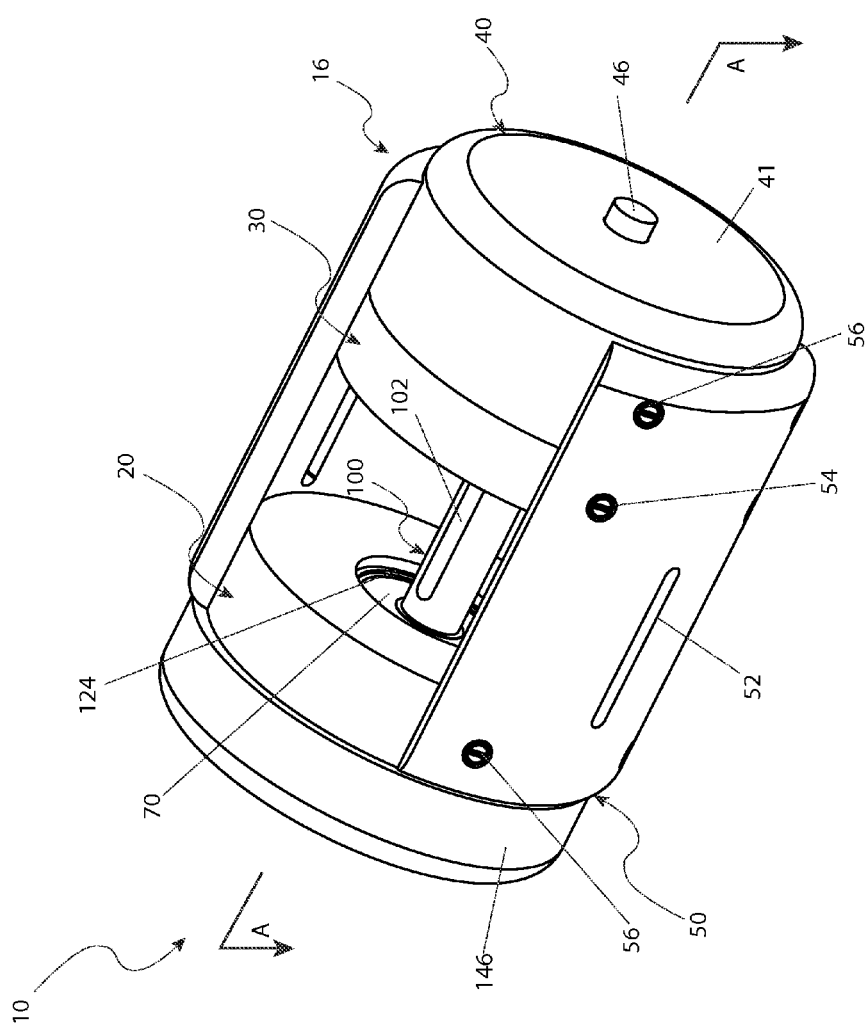
FIG. 1 is a perspective view of a tie-down strap coiling device in accordance with one embodiment of the present invention.

10 strap coiling device
16 housing
20 first section
21 external thread
22 first bearing bore
24 first bearing shoulder
26 first snap ring groove
28 rewind aperture
30 second section
32 second bearing bore
34 second bearing shoulder
36 second snap ring groove
38 spring housing face
40 third section
41 end face
42 stator mount
44 button aperture
46 button
48 cup
50 strap retainer
52 strap aperture
54 fastener aperture 56 threaded fastener
60 stator
62 splined aperture
64 stator fastener
66 stator return spring
68 stator aperture
70 bearing
80 return spring assembly
82 spring housing
84 housing retainer
86 spring hub
88 keyway
92 constant force spring
94 outer ring
96 wall
100 spindle
102 strap slot
104 shoulder
106 bearing journal
108 snap ring groove
112 keyway
114 neck
116 spline
118 rewind slot
122 woodruff key
124 internal snap ring
126 external snap ring
130 rewind crank
132 shaft
134 knob
136 spinner
138 blade
142 point
144 storage cover
146 internal thread
150 strap

DETAILED DESCRIPTION OF THE
PREFERRED EMBODIMENT

In accordance with the invention, the best mode is presented in terms of a one (1) or more of the disclosed embodiments, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Figure 2:
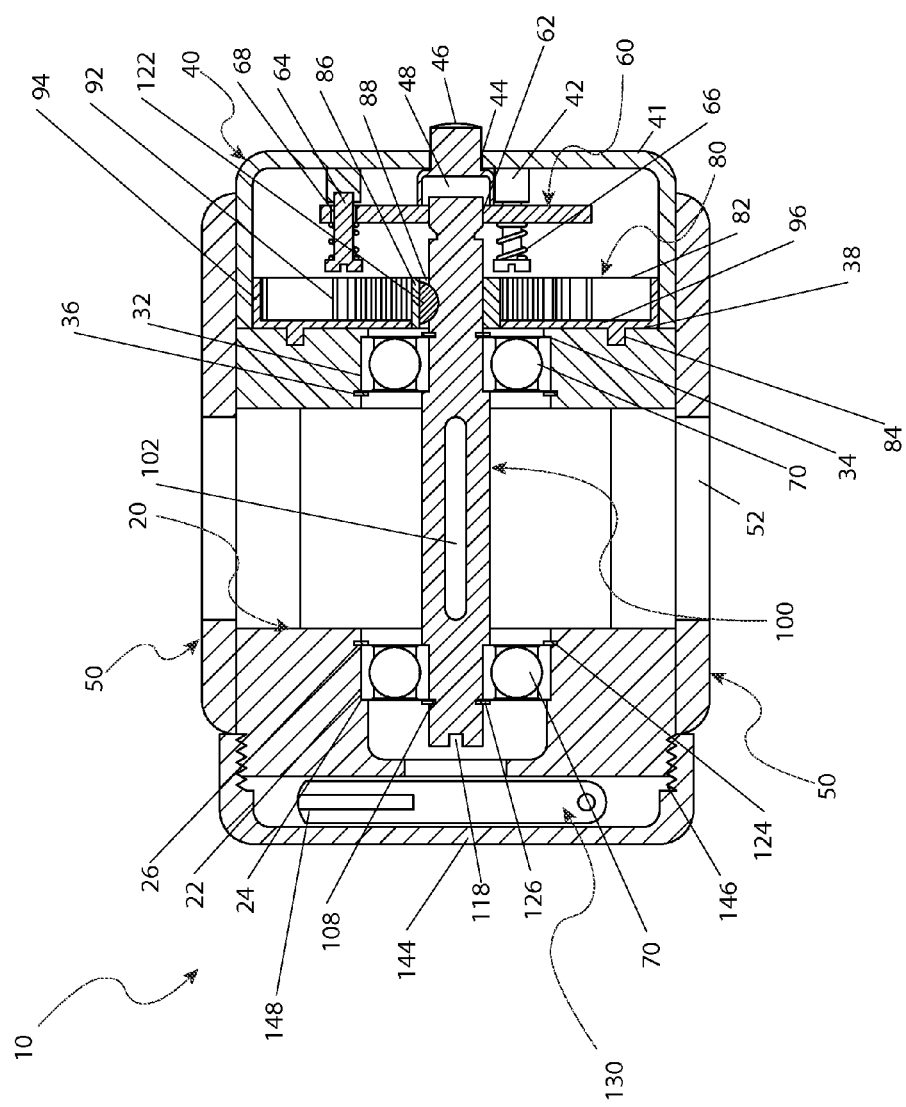
FIG. 2 is a section view of the strap coiling device taken along a line A-A of FIG. 1.
Figure 3:
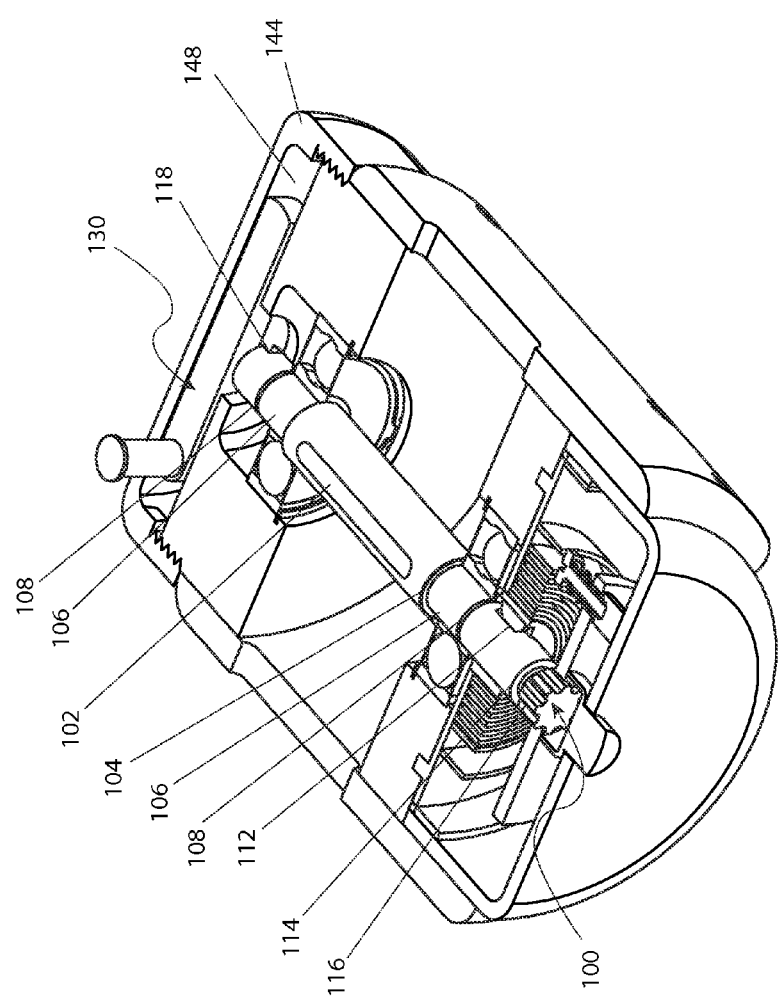
FIG. 3 is a breakaway perspective view of the strap coiling device in accordance with the one embodiment of the present invention.

Referring to FIGS. 1-6, disclosing example embodiments of the disclosed excess tie-down strap coiling device (herein known as the "device") 10, where like reference numerals represent similar or like parts. The device 10 provides a means to conveniently secure any excess strap 150 (FIG. 5) of a ratcheting dunnage tie-down apparatus by rolling the strap 150 onto a contained spindle 100 (FIGS. 1-3).

It should be noted that since certain variability exists in different models of tie-down devices there may be a range of sizes implicit in the example embodiment without limitation of scope.

Referring to FIGS. 1 and 2, the device 10 includes a housing 16 and a spindle 100 attached to a constant-force return spring assembly 80 (FIG. 2).

The housing 16 is preferably made of a thermoplastic material and constructed from a plurality of injection-molded parts, which may be presented in a wide variety of colors and surface finish textures. However, it is understood that other materials may be utilized without limiting the scope of the device 10.

The housing 16 is configured to generally be cylindrical with a first section 20, a second section 30, and a third section 40 conjoined by a pair of strap retainers 50. The housing 16 may, in some embodiments, be shaped as a polyhedron having one (1) or more planar faces, such as, but not limited to, hexagonal or octagonal, so as to beneficially exploit that configuration to obviate any instability arising from placing the device 10 on a slightly inclined and planar support surface.

Referring to FIG. 2, the first section 20 includes those features necessary to accommodate a bearing 70, such as a first bearing bore 22 to support an outer race of a bearing 70, as well as a first bearing shoulder 24 and a first snap ring groove 26 to define a position and secure the bearing 70 in that location. The bearing 70 is preferably a permanently lubricated, sealed, ball bearing having sufficient load carrying capability to support the spindle 100 in all conditions while simultaneously permitting a reduced effort to the rotation of the spindle 100 necessary to the function of the device 10. Other types of bearings, such as needle roller bearings or cylindrical roller bearings, may be utilized without limiting the scope of the device 10.

An internal snap ring 124 is placed into the first snap ring groove 26 to secure the lateral position of the outer race of the bearing 70 in the event that a press fit between the outer race and the bearing bore 22 is not sufficient to eliminate any displacement. The internal snap ring 124 is of a size appropriate to the external diameter of the bearing bore 22 and the diameter of the outer race of the bearing 70 and is provided with two (2) apertures for installation and removal with standard needle-nose snap ring pliers.

Referring to FIGS. 2 and 3, disposed centrally in an end face of the first section 20, opposite from the bearing 70, is a rewind aperture 28 (FIG. 3) configured to permit access to the end of the spindle 100 for the purpose of inputting a rotational motion to the spindle 100. Disposed in the outer diameter of the first section 20 is an external thread 21 (FIG. 3) cut, or formed, preferably to a Unified National Fine standard, for several flights in from the outer face. This external thread 21 corresponds to a complimentary internal thread 146 cut, or formed, into the inside diameter of a storage cover 144.

The storage cover 144 is an end cap, composed of the same constituent material as the remainder of the housing 16, which can be attached to the first section 20 by means of the engaged external thread 21 and the internal thread 146 creating an enclosed storage compartment 148.

Referring to FIGS. 1 and 2, the second section 30 (FIG. 1) is similarly configured with a second bearing bore 32, a second bearing shoulder 34 and a second snap ring groove 36 to accommodate the insertion of a bearing 70 (FIG. 2) in an opposite-hand arrangement from the first section 20. The second section 30 terminates at a spring housing face 38 (FIG. 2) on an opposite side from the second bearing bore 32. Disposed on the spring housing face 38 is a plurality of circular wells for receiving the housing retainers 84 on the spring housing 82 (FIG. 2) of the return spring assembly 80.

The third section 40 is generally bowl-shaped with a button aperture 44 (FIG. 2) disposed in the center of the end face 41. The button aperture 44 is provided for clearance through which a cylindrical button 46 will project. The button 46 is configured to have a hollow cylindrical cup 48 (FIG. 2) attached thereto. The outside diameter of the cup 48 will be larger than the diameter of the button 46 and larger than the diameter of the button aperture 44. When the button 46 is inserted through the button aperture 44 from the interior of the third section 40, the cup 48 will retain the button 46 within the third section 40 as best illustrated in FIG. 2. The button 46 and the cup 48 will preferably be formed as a single piece from a rigid thermoplastic material in an injection molding process.

Referring to FIG. 2, disposed in an even pattern on an interior surface of the end face 41 is a plurality of stator mounts 42. The stator mounts 42 are preferably configured to be cylindrical projections of the end face 41 to which threaded stator fasteners 64 are attached in threaded apertures (not shown). The stator fasteners 64 are each inserted through a stator return spring 66 then through the stator aperture 68 in a stator 60 and finally threaded into the threaded apertures of the stator mount 42.

The stator 60 is preferably a circular, rigid thermoplastic disk with a centrally located splined aperture 62 intended to selectively prevent the spindle 100 from rotating. The stator return springs 66 are preferably compression-type, steel springs configured to be trapped between the head of the stator fastener 64 and an interior face of the stator 60 so as to push the stator 60 toward the end face 41 of the third section 30. The button 46 will be inserted through the button aperture 44 of the end face 41 prior to fastening the stator 60 to the stator mounts 42 with the stator fasteners 64 during the normal course of assembly of the device 10. The cup 48 attached to the button 46 will contact an outer face of the stator 60 and therefore the button 46 will be biased to extend through the button aperture 44.

Referring to FIGS. 1, 2, and 6, the strap retainers 50 are configured to be pieces of a preferably rigid thermoplastic material having an arcuate cross-section, or other profile, conforming to the diameter of the first section 20, the second section 30, and the third section 40. The strap retainers 50 are provided with a plurality of fastener apertures 54 (FIG. 1) through which threaded fasteners 56 are inserted to attach all of the parts of the device 10 together into the housing 16.

The strap retainers 50 are intended to contain the coiled excess tie-down strap 150 within the housing 16 during the transportation of the dunnage, as best illustrated in FIG. 6. Disposed along each of the strap retainers 50, in alignment with a strap slot 102 in the spindle 100, is a strap aperture 52. The strap aperture 52 is a rectangular, or oblong, slot through which the excess tie-down strap 150 is inserted in order to be introduced into the housing 16 for coiling, as best illustrated in FIG. 6.

It is understood that the device 10 may be configured without the strap apertures 52 provided that sufficient clearance is allotted between the strap retainers 50 to properly insert the excess tie-down strap 150 into the strap slot 102 of the spindle 100.

Referring to FIGS. 2 and 3, the spindle 100, as seen in totality in FIG. 3, is preferably a steel shaft machined, or forged, to have all of the necessary features to be used in the device 10. It is understood that other materials, such as thermoplastic materials with enhanced characteristics presently under development, or other metals, may be utilized without limiting the scope of the device 10.

That portion of the spindle 100 which is normally enclosed within the first section 20 is provided with a bearing journal 106 (FIG. 3) onto which the inner race of a bearing 70 (FIG. 2) can be installed in a press fit, a shoulder 104 (FIG. 3), configured to be an increased shaft diameter beyond the bearing journal 106 (FIG. 3) to form a positional abutment for inner race of the bearing 70, and a snap ring groove 108 for the installation of an external snap ring 126 (FIG. 2) to retain the inner race in the correct position.

The external snap ring 126 is of a size appropriate to the diameter of the bearing journal 106 and the internal diameter if the inner race of the bearing 70 and is preferably provided with pointed tip ends for installation and removal with standard jaw-type snap ring pliers. Some length of shaft is extended beyond the snap ring groove 108 toward the rewind aperture 28. Disposed in this first end of the spindle 100 is a rewind slot 118.

That portion of the spindle 100 which is normally enclosed within the second section 30 is also provided with a bearing journal 106, a shoulder 104, and a snap ring groove 108 (FIG. 3) similar to those features previously discussed for an identical bearing 70.

That portion of the spindle 100 between the shoulders 104, and consequently between the first section 20 and the second section 30, is provided with the strap slot 102. The strap slot is an oblong aperture through the spindle 100. A free end of that portion of a tie-down strap 150 (FIG. 6) that extends beyond a holding mechanism (i.e. the excess strap 150) is inserted through the strap slot 102 of the spindle 100 such that when the spindle 100 is rotated by some means, the strap 150 will be folded over upon itself and be gathered onto the spindle 100.

That portion of the spindle 100 which is normally enclosed within the third section 40 is provided with a keyway 112, a neck 114, and a spline 116 (FIG. 3). The keyway 112 is preferably configured to be a semi-circular pocket as is utilized with a woodruff key 122 (FIG. 2) due to the uniformity in the spindle 100 diameter. The neck 114 is configured to be an abrupt reduction in the diameter of the spindle 100 with a tapering return to the original diameter so as to form a radial groove. The spline 116 is a plurality of longitudinal grooves disposed radially about the second end of the spindle 100. This spline 116 matches the splined aperture 62 in the stator 60 (FIG. 2) and is in fact engaged in the splined aperture 62 to hold the spindle 100 from rotating at any time when the button 46 is not depressed.

When the button 46 is depressed, the cup 48 displaces the stator 90, compressing the stator return springs 66, and disengaging the splined aperture 62 from the splines 116 toward the smaller diameter neck 114, thus allowing the spindle to rotate according to the influences of other forces. The cup 48 attached to the button 46 is configured to have an internal diameter slightly larger than the diameter of the splines 116 of the spindle 100 and a depth sufficient to provide ample clearance for the splines 116 prior to achieving the end of travel for the stator return springs 66. When the button 46 is released, the stator return springs 66 displace the stator 60, thereby forcing the splined aperture 62 back into engagement with the splines 116, beneficially assisted by the tapered feature of the neck 114, to again block the rotation of the spindle 100. The spindle 100 may be provided with any chamfers, fillets, or reliefs as is normal with the standards and practices of the industry without limiting the scope of the device 10.

The location of the keyway 112 in the spindle 100 corresponds to the location of the return spring assembly 80 in the third section 40. The return spring assembly 80 includes a spring housing 82, a spring hub 86, and a constant-force spring 92 (FIG. 2). The spring housing 82 is configured to be an annular outer ring 94 with a thin disk on a first side thereof forming a circular wall 96 having a centrally located aperture to accommodate the insertion of the spring hub 86. Disposed upon an exterior face of the wall 96 (FIG. 2) is a plurality of housing retainers 84 configured to be cylindrical projections of the wall 96. The spring housing 82 is preferably formed as a single piece from a thermoplastic material in an injection-molding die.

The housing retainers 84 are pressed into apertures (not shown) in the spring housing face 38 of the second section 30. The spring hub 86 is configured to be an annular ring of a thermoplastic material provided with the keyway 88 to accommodate the woodruff key 122. The woodruff key 122 constitutes the attachment point of the spring hub 86 to the spindle 100.

The constant-force spring 92 is connected at a first end to the interior of the outer ring 94 of the spring housing 82 and to the spring hub 86 at a second end. The constant-force spring 92 is configured to be in a relaxed state when coiled against the interior of the outer ring 94 and in a state of higher potential energy when coiled against the spring hub 86. The movement of the constant-force spring 92 from the wound or higher energy state, to the relaxed state results in the rotation of the spindle 100.

Referring to FIGS. 4 and 5, a rewind crank 130 is provided in the event that the constant-force spring 92 is inadvertently permitted to unwind without a strap 150 being attached to the spindle 100. This unwinding can occur when the button 46 is depressed with no restraint on the spindle 100. The rewind crank 130 includes a blade 138 with a point 142, a shaft 132, and a knob 134 preferably equipped with a spinner 136, as best illustrated in FIG. 5. The rewind crank 130 is preferably fabricated from stamped metal parts, circular tubes, and rod. Other materials, such as thermoplastics, may be utilized without limiting the scope of the device 10.

The blade 138 is configured to have a point 142 located at some distance from the attachment point of the blade 138 to the shaft 132. The storage cover 144 is unthreaded and entirely removed from the first section 20 to expose the rewind aperture 28. The point 142 of the rewind crank 130 is then placed inside of the rewind aperture 28 at some location along the periphery of the rewind aperture 28. The blade 138 is rotated with the point travelling along the periphery of the rewind aperture 28 until the blade is brought into alignment with the rewind slot 118 of the spindle 100 (FIG. 2). The shaft 132 and the blade 138 are then pivoted inwardly until the blade engages into the rewind slot 118. The blade 138 is configured to have a semi-circular profile to more easily accomplish this task.

The shaft 132 is a length of rectangular rod attached to the blade 138 intended to provide a moment arm in order to apply sufficient torque to rewind the constant-force spring 92. The knob 134 is a cylindrical rod pressed into an aperture in the shaft 132 that acts as a handle for a user to grasp and turn the rewind crank 130. The spinner 136 is a loose fitting cylinder fitted over the knob 134 and retained thereon by preferably peening a bulbous end onto the knob 134. The spinner 136 provides a journal bearing of sorts to reduce the friction between a user's fingers and the knob 134 to facilitate rotating the rewind crank 130.

Referring to FIGS. 1-4, the button 46 must be depressed in order to disengage the splined aperture 62 of the stator 60 from the splines 116 of the spindle 100 in order to allow the spindle 100 to rotate and thus rewind the constant-force spring 92. The button 46 must then be released to again lock the spindle 100 prior to relieving the applied torque from the rewind crank 130. The rewind crank 130 can then be removed from the device 10 and conveniently placed within the storage compartment 148 of the storage cover 144 for safekeeping prior to installing the storage cover 144 back onto the first section 20.

Referring to FIG. 4, an arrow may be embossed onto the end of the first section 20 in proximity to the rewind aperture 28 to indicate the proper direction to turn the rewind crank 130 in order to successfully accomplish the rewinding of the constant-force spring 92.

In some embodiments, a ratcheting dog may be incorporated into the device 10 for use during the rewinding procedure in order to alleviate a continuous application of recoil force on the rewind crank 130.

Those skilled in the art will recognize that other styles and configurations of the disclosed device 10 can be easily incorporated into the teachings of the present disclosure, and only particular example embodiments and configurations have been shown and described for purposes of clarity and disclosure and not by way of limitation of scope.

The example embodiments of the present invention can be utilized by the user in a simple and effortless manner with little or no training After initial purchase or acquisition of the device 10, it would be installed and utilized as indicated in FIGS. 1 and 6.

One (1) exemplary embodiment of a method for installing and utilizing the device 10 may be achieved by performing the following steps: 1). acquiring a model of the device 10 having a desired size and style to suit the requirements of a user; 2). loading the items selected to be transported into the chosen conveyance vehicle; 3). securing the items with a ratchet-style tie-down strap 150; 4). inserting the free end of the excess tie-down strap 150 through the strap aperture 52 of one (1) of the strap retainers 50 and into the strap slot 102 in the spindle 100; 5). grasping the device 10 firmly in both hands; 6). depressing the button 46 thereby disengaging the stator 60 from the splines of the spindle 100; 7). allowing the constant force spring 92 to rotate the spindle 100 thereby coiling the excess strap 150 onto the spindle 100; 8). releasing the button 46 when all of the excess strap 150 has been coiled; and 9). leaving the device 10 suspended at the ratchet mechanism until such time as the transported item is to be offloaded.

At this point the splines 116 of the spindle 100 may not be in a proper alignment to be engaged into the splined aperture 62 of the stator 60; however, the constant force spring 92 will continue to exert a tension force upon the tie-down strap 150 so as to continue holding the strap 150 taut.

One (1) exemplary embodiment of a method for removing the device from the tie-down strap 150 prior to offloading the transported item by performing the following steps: 1). grasping the device 10; 2). depressing the button 46 thereby disengaging the stator 60 from the splines 116 of the spindle 100; 3). pulling the device 10 away from the ratchet mechanism thereby uncoiling the excess strap 150 from the spindle 100, consequently recoiling the constant force spring 92; 4). releasing the button 46 thereby allowing the splined aperture 62 of the stator 60 to engage with the splines 116 of the spindle 100 just prior to the final uncoiling of the tie-down strap 150; 5). holding the device 10 such that all tension is released from the tie-down strap 150; and 6). removing the final wrap of the tie-down strap 150 from the spindle 100 while the spindle 100 is locked by the stator 60.

The constant-force spring 92 can be rewound if the need arises by performing the steps outlined in the previous discussion pertaining to the rewind crank 130.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A strap coiling device comprising:
    a housing having a central longitudinal axis;
    a spindle coaxially aligned with and rotatable about said central longitudinal axis of said housing and rotatably coupled within said housing, said spindle comprising a first end and a second end, said spindle comprising splines projecting outwardly from said second end perpendicular to said central longitudinal axis of said housing;
    a disk-shaped stator coaxially aligned with said central longitudinal axis of said housing and coupled within said housing, said stator being rotationally fixed about said central longitudinal axis of said housing and being linearly movable along said central longitudinal axis of said housing relative to said housing, said stator comprising a splined aperture coaxially aligned with said spindle and configured to releasably mate with said splines, said stator being linearly biased along said central longitudinal axis of said housing relative to said spindle to matingly engage said splines within said splined aperture to restrict rotational movement of said spindle about said central longitudinal axis of said housing; and,
    a return spring assembly operatively connected to said spindle within said housing, said return spring assembly being configured to rotate said spindle upon linear movement of said stator along said central longitudinal axis of said housing relative to said spindle and disengagement of said splines from within said spline aperture.

2. The device of claim 1, wherein said housing comprises:
    a first section;
    a second section spaced away from said first section;
    a third section directly adjacent to said second section; and,
    at least one strap retainer connecting said first section, said second section, and said third section;
    wherein said spindle is rotatably connected to said first section and extends through said second section and into said third section.

3. The device of claim 2, wherein:
    said first section comprises a first bearing operatively connected to said spindle proximate said first end; and,
    said second section comprises a second bearing operatively connected to said spindle proximate said second end.

4. The device of claim 3, wherein said first section further comprises a rewind aperture disposed therethrough and aligned with said spindle, and wherein said first end of said spindle is positioned directly adjacent said rewind aperture and comprises a rewind slot.

5. The device of claim 4, further comprising a rewind crank operatively engaged with said rewind slot for rotating said spindle and winding said return spring assembly.

6. The device of claim 3, wherein said stator is positioned within said third section.

7. The device of claim 6, wherein said third section further comprises a button in contact with said stator, and wherein movement of said button linear moves said stator and disengages said splined aperture and said splines to allow rotation of said spindle.

8. The device of claim 1, further comprising a length of strap comprising a free end, wherein said free end is coupled to said spindle and wound around said spindle in response to rotation of said spindle caused by said return spring assembly.

9. A strap coiling device comprising:
    a length of strap comprising a free end;
    a housing having a central longitudinal axis;
    a spindle coaxially aligned with and rotatable about said central longitudinal axis of said housing and rotatably coupled within said housing, said spindle comprising a first end, a second end, and a strap slot, said strap slot being configured to receive said free end of said strap, said spindle comprising splines projecting outwardly from said second end perpendicular to said central longitudinal axis of said housing;
    a disk-shaped stator coaxially aligned with said central longitudinal axis of said housing and coupled within said housing, said stator being rotationally fixed about said central longitudinal axis of said housing and being linearly movable along said central longitudinal axis of said housing relative to said housing, said stator comprising a splined aperture coaxially aligned with said spindle and configured to releasably mate with said splines, said stator being linearly biased along said central longitudinal axis of said housing relative to said spindle to matingly engage said splines within said splined aperture to restrict rotational movement of said spindle about said central longitudinal axis of said housing; and,
    a return spring assembly operatively connected to said spindle within said housing for rotating said spindle and winding said length of strap around said spindle within said housing upon linear movement of said stator along said central longitudinal axis of said housing relative to said spindle and disengagement of said splines from within said spline aperture.

10. The device of claim 9, wherein said housing comprises:
    a first section;
    a second section spaced away from said first section;
    a third section directly adjacent to said second section; and,
    at least one strap retainer connecting said first section, said second section, and said third section, said strap retainer comprising a strap aperture configured to receive said length of strap within said housing;

wherein said spindle is rotatably connected to said first section and said second section; and, wherein said spindle extends through said second section and into said third section.

11. The device of claim 10, wherein:

said first section comprises a first bearing operatively connected to said spindle proximate said first end; and, said second section comprises a second bearing operatively connected to said spindle proximate said second end.

12. The device of claim 11, wherein:

said first section further comprises a rewind aperture disposed therethrough and aligned with said spindle; and, said first end of said spindle is positioned directly adjacent said rewind aperture and comprises a rewind slot.

13. The device of claim 12, further comprising a rewind crank operatively engaged with said rewind slot for rotating said spindle and winding said return spring assembly.

14. The device of claim 13, wherein said third section further comprises a button in contact with said stator, and wherein movement of said button linearly moves said stator and disengages said splined aperture and said splines to allow rotation of said spindle.

15. A strap coiling device comprising:

a housing having a central longitudinal axis and comprising:

a first section comprising a first bearing;

a second section spaced away from said first section and comprising a second bearing;

a third section directly adjacent to said second section; and, a pair of strap retainers connecting said first section, said second section, and said third section;

a spindle coaxially aligned with and rotatable about said central longitudinal axis of said housing, said spindle comprising a first end rotatably coupled to said first bearing, a second end rotatably coupled to said second bearing, and a strap slot disposed between said first end and said second end, said spindle comprising splines projecting outwardly from said second end perpendicular to said central longitudinal axis of said housing and extending into said third section;

a disk-shaped stator coaxially aligned with said central longitudinal axis of said housing and coupled within said housing, said stator being rotationally fixed about said central longitudinal axis of said housing and being linearly movable along said central longitudinal axis of said housing relative to said third section, said stator comprising a splined aperture coaxially aligned with said spindle and configured to releasably mate with said splines, said stator being linearly biased along said central longitudinal axis of said housing relative to said spindle to matingly engage said splines within said splined aperture to restrict rotational movement of said spindle about said central longitudinal axis of said housing; and, a return spring assembly positioned between said second section and said third section and operatively connected to said spindle for rotating said spindle upon linear movement of said stator along said central longitudinal axis of said housing relative to said spindle and disengagement of said splines from within said spline aperture, said return spring assembly being biased in a wound configuration.

16. The device of claim 15, wherein said first section further comprises a rewind aperture disposed therethrough and aligned with said spindle, and wherein said first end of said spindle is positioned directly adjacent said rewind aperture and comprises a rewind slot.

17. The device of claim 16, further comprising a rewind crank operatively engaged with said rewind slot for rotating said spindle and winding said return spring assembly.

18. The device of claim 17, further comprising a storage cover threadably connected to said first section for covering said rewind aperture and storing said rewind crank.

19. The device of claim 18, wherein said third section further comprises a button in contact with said stator, and wherein movement of said button linear moves said stator and disengages said splined aperture and said splines to allow rotation of said spindle.

20. The device of claim 19, wherein a free end of a length of strap is received in said strap slot and automatically wound around said spindle within said housing in response to said button being moved to disengage said splined aperture and said splines to allow rotation of said spindle caused by said return spring assembly.

* * * * *